United States Patent Office 3,493,433
Patented Feb. 3, 1970

3,493,433
ELECTRODEPOSITION OF ALKALI METALS
FROM NONAQUEOUS SOLVENTS
Arthur Kentaro Hoffmann, Stamford, Conn., assignor to American Cyanamid Company, Stamford, Conn., a corporation of Maine
No Drawing. Filed Oct. 13, 1964, Ser. No. 403,658
Int. Cl. H01m 43/02, 43/04, 27/04
U.S. Cl. 136—28                    19 Claims

ABSTRACT OF THE DISCLOSURE

A solvent-electrolyte solution or mixture for the high plating efficiency of sodium and lithium metals in electrochemical cells, said solution or mixture comprising a salt of the alkali metal to be electrodeposited substantially completely dissolved in liquid sulfur dioxide and the use of such a system in a battery.

---

This invention relates to the electrodeposition of metals. More particularly this invention relates to the electrodeposition of alkali metals in non-aqueous solution.

Much interest has been generated in recent years in the development of secondary or reversible storage batteries having a high energy output per unit weight. Portable high energy density reversible power supplies are required for powering satellite equipment during dark orbiting cycles. Obviously such batteries would be useful in any device requiring a high energy, lightweight, reversible power source such as power tools and appliances as well as automobile, ship and airplane electrical systems.

High energy output and low weight requires the use of active materials as the electrodes and in particular active materials having low equivalent weights. The alkali metals qualify in these respects. However, since the alkali metals are generally reactive in electrolyte systems containing water, acids, alcohols, or other proton donating solvents, these liquids must be replaced by solvents incapable of undergoing protolytic reactions with alkali metals. A continuing problem in the choice of such solvents is the tendency to co-reduction of said solvents during the discharge of alkali metal ions to form the free metal. Thus it is apparent that not only must the solvent dissolve and promote the electrical conductivity of the electrolyte, but it must also remain substantially chemically inert to the electrodes and electrolyte during storage as well as during operation of the electro-chemical system. In like manner the electrolyte must be chemically inert to the electrodes.

Apart from the development of reversible storage battery systems requiring active materials as the electrodes and the inert enclosure materials, the discovery of stable solvent-electrolyte systems for the electrodeposition of alkali metals defines a broader area of utility. For example, in the electrowinning or electroplating of alkali metals the electrodes themselves need not be active materials but may be any electrically conductive material suitabl for the purpose such as platinum, carbon, graphite, metal amalgams, and the like.

While attempts have been made to electrodeposit alkali metals, so far as is known the high plating efficiencies over a fairly wide range of current densities required for effective electroplating, and particularly at current densities above 25 milliamperes per square centimeter (ma./cm.$^2$), have not been successful, especially as a consequence of the co-reduction of solvent mentioned above. For example, it is known that lithium can be electrodeposited from a lithium salt dissolved in propylene carbonate with high plating efficiency. However, the high plating efficiency is limited to current densities of about 25 ma./cm.$^2$ or less. See "New Cathode-Anode Couples Using Nonaqueous Electrolytes," U.S. Aeronautical Systems Division Technical Documentary Report No. ASD–TDR–62–1 (1962).

Attempts have also been made to electrodeposit potassium and sodium from solutions of their iodides or bromides in sulfur dioxide. In each instance the sulfur dioxide was found to react on standing with the alkali metal salt, probably to form hydrosulfites and then thiosulfate and pyrosulfite decomposition products. Hence, a stable system could not be obtained with these salts nor could the alkali metal be effectively electrodeposited. See Zeitschrift Für Electrochemie, 29, 210 (1923).

An object of this invention is to provide a chemically inert non-aqueous solvent-electrolyte system for the electrodeposition of alkali metals over a wide range of current density.

A further object is to provide an efficient process for the electrodeposition, electrowinning or electroplating of alkali metals over a wide range of current density.

Other objects include providing solvent-electrolyteelectrode systems for the electrodeposition of alkali metals, said systems forming the basis for high energy, lightweight secondary storage batteries.

These and other objects and advantages will be apparent from the detailed exposition which follows.

In its broadest aspect this invention is the discovery of a solvent-electrolyte system which is not subject to co-reduction during the discharge of alkali metal ions to form free alkali metal in an electrochemical cell and which promotes electrodeposition over a wide range of current density. It is essentially the co-reduction of solvent with consequent formation of solvent decomposition products which prevents high plating efficiencies in the electrodeposition of alkali metals.

Percent plating efficiency is defined as follows:

Percent plating efficiency =

$$\frac{\text{equivalents of alkali metal plated}}{\text{total Faradays passed}} \times 100$$

Plating efficiencies are relative to electrode material, solvent, electrolyte and current density of the electrochemical system. By current density is meant the number of amperes of electricity passed through a system per square centimeter of cathode surface. For effective electroplating, high plating efficiency should be maintained over a fairly wide range of current densities, e.g., from about 10 to 100 ma./cm.$^2$ or more.

In accordance with the present invention there is provided a solvent-electrolyte solution or mixture for the high plating efficiency of sodium and lithium metals in electrochemical cells, said solution or mixture comprising a salt of the alkali metal to be electrodeposited substantially completely dissolved in liquid sulfur dioxide.

Where the application of the electrochemical system is solely for the electrodeposition of alkali metals as distinguished from complete secondary storage battery systems, the electrodes may be of any conductive material which is chemically inert to the solvent electrolyte solution. Cathode and anode materials would therefore include any of the alkali or alkaline earth metals such as lithium, sodium, calcium and magnesium as well as transition series metals including platinum, copper, nickel, mercury, silver, cadmium, aluminum and the like. Conductive non-metals such as carbon, graphite, silicon, and the like are also useful. It will be apparent also that alloys, amalgams and mixtures of conductive metals and non-metals may be employed. Among such materials are included stainless steel, Monel metals, Inconel, Hastelloys and the like; compressed metal powder and carbon electrodes, sintered or foamed metal electrodes, and the like.

For reversible storage battery systems an anode of lithium or sodium, alone or over another conductive base material, e.g., lithium supported on nickel or platinum, will be required depending on whether a lithium or sodium system is desired. Cathode materials may vary widely and include materials such as silver chloride or bromide, silver oxide, nickel fluoride, and the like.

Electrodes in the molten state may also be employed where the electrode material has a melting point below the critical temperature of sulfur dioxide, e.g., sodium.

Liquid sulfur dioxide is employed as the solvent in the practice of this invention. Any conditions of temperature and pressure which will maintain sulfur dioxide in the liquid state may be used. However, it is preferred to maintain the sulfur dioxide under sufficient pressure in order that the system will be operative at room temperature. Nevertheless it will be obvious that any temperature up to the critical temperature of sulfur dioxide may be utilized since the essential requirement is only that the sulfur dioxide be maintained in a liquid state in order to dissolve the electrolyte.

The electrolyte salts which may be employed in the practice of the present invention are limited to those sodium or lithium salts which dissolve in liquid sulfur dioxide to an extent sufficient to provide a useful specific conductivity and which are substantially chemically inert to the electrodes and the sulfur dioxide. Specific conductivity, since it is a function of temperature as well as concentrations of salt and sulfur dioxide, may vary widely. Generally, the specific conductivity should be at least about $5 \times 10^{-5} \Omega^{-1}$-cm.$^{-1}$ at 22° C. Examples of these salts are lithium and sodium tetrachloroaluminate and lithium and sodium tetrabromoaluminate. So far as is known these are the only lithium and sodium salts which have sufficient solubility and conductivity in liquid sulfur dioxide without the need for cosolvents so as to permit high percent plating efficiency of lithium and sodium metals over a wide range of current density.

The relative proportions of liquid sulfur dioxide and electrolyte salt are a matter of choice depending on the solubility of the components in each other at a given temperature and pressure. Generally, sufficient liquid sulfur dioxide should be present to substantially completely dissolve the electrolyte and the relative amounts of sulfur dioxide and alkali metal salts should be such as to provide a useful specific conductivity. From about 0.1 to 1.0 molar solution of the salt in liquid sulfur dioxide will generally give the requisite solubility and conductivity but obviously the concentration may be varied substantially according to the conductivities desired.

For high percent plating efficiency an inert material such as glass, high density polyethylene, polypropylenes, polytetrafluoroethylenes or the like is employed as the cell enclosure. The cell is constructed so as to permit maintaining an inert atmosphere within the cell closure while excluding atmospheric moisture, nitrogen and oxygen. Inert gases such as argon, xeon and helium may be used for this purpose. Conventional means are provided for the addition and exit of the desired gases and for the insertion of the electrodes. The electrodes may be any active conductive material or inactive conducting material such as those noted above. In typical embodiments, the anode is inserted as a coil, plate or sheet of metal or it may be a bed of saturated metal amalgam.

The solvent-electrolyte systems of the present invention are totally unexpected discoveries since liquid sulfur dioxide is normally discharged, i.e., reduced, decomposed, at low voltages at metal electrode surfaces such as mercury, platinum and nickel over a wide range of current density. Moreover, the wide acceptance of sulfur dioxide as an excellent ionizing solvent for alkali metal salts is not anyways borne out in fact. Thus many alkali metal salts soluble in liquid sulfur dioxide, such as lithium fluoride, do not ionize measurably and give solutions with resistances too high for plating. Hence, it is not predictable that lithium or sodium ions would be reduced, without substantial reduction of sulfur dioxide, at potentials which far exceed, i.e., are more negative than, the reduction potential ordinarily observed at discharge of sulfur dioxide.

Acetal-amine reaction

While the underlying reasons for the anomalous behavior of the systems of this invention are not precisely known it is thought that the sulfur dioxide not only "passivates," i.e., lowers the reactivity of the alkali metal to sulfur dioxide, but also forms charge-transfer complexes with the electrolyte salt anions at the electrode surface thereby preventing reduction of the sulfur dioxide. Also, it would seem that the sodium and lithium salts of this invention, which have low ionic lattice energies and therefore low melting points, dissociate readily in sulfur dioxide and thereby encourage formation of sulfur dioxide charge-transfer complexes which stabilize the system.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

For measurement of plating efficiency a conventional cylindrical glass electrochemical cell was constructed. The cell had a top closure permitting the contents of the cell to be maintained under an argon or other convenient inert atmosphere while excluding atmospheric moisture, nitrogen and oxygen. Provision is also made for the addition and exit of desired gases and for insertion of a cathode and leads to the anode and to a third probe reference electrode (a standard calomel electrode).

Plating was carried out under controlled current density at the electrodes whereby the total number of Faradays passed through the cell was known for a given period of time. The amount of metal electrodeposited was determined by removing the cathode and placing it in a calibrated eudiometer tube and measuring the amount of hydrogen gas evolved when the cathode is contacted with water. Percent plating efficiency is defined as follows:

Percent plating efficiency =

$$\frac{\text{equivalents of alkali metal plated}}{\text{total Faradays passed}} \times 100$$

A slightly less than 1 molar solution of lithium tetrachloroaluminate, LiAlCl$_4$, in liquid SO$_2$ at $-10°$ C. to $-30°$ C. was electrolyzed using lithium metal as the anode and nickel, 1 cm.$^2$, as the cathode. Dissolution of the salt in SO$_2$ was effected by first condensing SO$_2$ into the electrolytic cell, which was maintained at about $-30°$ C. to $-10°$ C. by a cooling jacket, and thereafter adding the salt. Table I below summarizes plating conditions and shows the high plating efficiencies achieved by the system. Lithium could not be effectively plated from SO$_2$ solution of LiF or LiClO$_4$, due to the low specific conductivity of these solutions. LiCl was insoluble in the $SO_2$.

TABLE I

| Current density (ma./cm.²) | 10 | 25 | 50 |
|---|---|---|---|
| Reduction potential [1] (volts) | −0.6 | −0.8 | −1.0 |
| Rest potential of Liplated cathode* (volts) | 0.0 | 0.0 | 0.0 |
| Percent plating efficiency | 93.4 | 96.0 | 94.1 |

*All potentials in Examples 1–2 are referred to a lithium metal reference electrode. In a further test, Example 1 was repeated with substantially equivalent results using a platinum cathode, 1 cm.².

EXAMPLE 2

In essentially the same manner as in Example 1, high percent plating efficiencies were obtained by using lithium tetrabromoaluminate ($LiAlBr_4$) instead of $LiAlCl_4$.

EXAMPLE 3

Sodium was electrodeposited from a 1.0 molar solution of sodium tetrachloroaluminate ($NaAlCl_4$) in liquid sulfur dioxide maintained at −15° C. to −25° C. The apparatus and procedure were essentially the same as in Example 1 except that the anode was sodium metal. The sodium deposit was dark- to blue-gray in color and adhered well. The iR drop across the cell varied from 0 volt at 10 ma./cm.² to 10–15 volts at 100 ma./cm.². Table II summarizes the results. A sodium metal plated nickel electrode was the reference electrode.

TABLE II

| Current density (ma./cm.²) | 10 | 25 | 50 | 100 |
|---|---|---|---|---|
| Reduction potential (volts) | −1.0 | −1.2 | −1.6 | −2 |
| Rest potential of cathode (volts) | 0.0 | 0.0 | 0.0 | 0.0 |
| Percent plating efficiency | 88.9 | 93.5 | 93.5 | 93.8 |

EXAMPLE 4

The procedure of Example 3 was substantially repeated except that sodium tetrabromoaluminate ($NaAlBr_4$) was substituted for $NaAlCl_4$. High percent plating efficiencies were observed. In this and preceding examples the addition of tetrabutyl ammonium perchlorate,

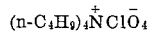

a known highly conducting solvent for lithium and sodium salts, did not substantially enhance the plating efficiency.

EXAMPLE 5

Table III below shows results for plating lithium from propylene carbonate saturated with $LiAlCl_4$ and $SO_2$. The anode and cathode materials were lithium metal and nickel, 1 cm.², respectively. The apparatus and procedure were substantially the same as in the preceding examples except that the $SO_2$ was bubbled as a gas through the propylene carbonate and the $LiAlCl_4$ was thereafter added. High plating efficiency could be obtained without $SO_2$ only for 5–10 ma./cm.² current densities. It was found that the addition of $SO_2$ decreased the iR drop across the cell from 25 V. at 10 ma./cm.² to less than 5 v. at 50 ma./cm.². This example demonstrates that adding a secondary solvent such as propylene carbonate may promote solubility of the system but does not further improve the percent plating efficiency and in fact may decrease it.

TABLE III

| Current density (ma./cm.²) | 5 | 10 | 25 | 50 |
|---|---|---|---|---|
| Reduction potential (volts) | −3.6 | −3.9 | −5.0 | −5.9 |
| Rest potential of cathode (volts) | −3.2 | −3.4 | −3.3 | −3.4 |
| Percent plating efficiency | 98.2 | 97.1–0.3 | 94.9 | 73.4 |

EXAMPLE 6

A battery system is constructed in essentially the same manner as in Example 1 except for the cathode which is silver-silver chloride. The cathode is prepared by compressing a 2:1 intimate mixture of its powdered components into a solid conductive mass. The open circuit voltage measured upon discharge of this cell is 2.8 volts.

The reversibility of this system is further demonstrated by constructing the cell in a totally discharged state employing a nickel cathode upon which lithium is plated during the charging process. After electrolysis (charging) the open circuit voltage is 2.8 volts.

What is claimed is:

1. A solvent-electrolyte system for the electrodeposition of alkali metals selected from the group consisting of sodium and lithium, comprising a salt of said alkali metal selected from the group consisting of sodium and lithium tetrachloroaluminate and tetrabromoaluminate substantially completely dissolved in liquid sulfur dioxide.

2. A solvent-electrolyte system for the electrodeposition of lithium metal comprising lithium tetrachloroaluminate substantially completely dissolved in liquid sulfur dioxide.

3. A solvent-electrolyte system for the electrodeposition of lithium metal comprising lithium tetrabromoaluminate substantially completely dissolved in liquid sulfur dioxide.

4. A solvent-electrolyte system for the electrodeposition of sodium metal comprising sodium tetrachloroaluminate substantially completely dissolved in liquid sulfur dioxide.

5. A solvent-electrolyte system for the electrodeposition of sodium metal comprising sodium tetrabromoaluminate substantially completely dissolved in liquid sulfur dioxide.

6. A process for electrodepositing alkali metals comprising electrolyzing an alkali metal salt selected from the group consisting of sodium and lithium tetrachloroaluminate and tetrabromoaluminate substantially completely dissolved in liquid sulfur dioxide.

7. A process for electrodepositing lithium comprising electrolyzing lithium tetrachloroaluminate substantially completely dissolved in liquid sulfur dioxide.

8. A process for electrodepositing lithium comprising electrolyzing lithium tetrabromoaluminate substantially completely dissolved in liquid sulfur dioxide.

9. A process for electrodepositing sodium comprising electrolyzing sodium tetrachloroaluminate substantially completely dissolved in liquid sulfur dioxide.

10. A process for electrodepositing sodium comprising electrolyzing sodium tetrabromoaluminate substantially completely dissolved in liquid sulfur dioxide.

11. A process for electrodepositing alkali metals selected from the group consisting of sodium and lithium comprising electrolyzing a mixture of sulfur dioxide, lithium tetrachloroaluminate and ethylene carbonate in relative amounts sufficient to provide substantial mutual solubility.

12. An electrochemical cell comprising an anode and a cathode immersed in a solution of liquid sulfur dioxide and an electrolyte salt selected from the group consisting of sodium and lithium tetrachloroaluminate and tetrabromoaluminate, said sulfur dioxide and salt being in relative amounts sufficient to provide a specific conductivity of at least about $5 \times 10^{-5} \Omega^{-1}$ cm.$^{-1}$ at 22° C.

13. A reversible electrochemical cell comprising a nickel anode and a silver-silver chloride cathode, said anode and said cathode being immersed in a solution of liquid sulfur dioxide and lithium tetrachloroaluminate in relative amounts sufficient to provide a specific conductivity of at least about $5 \times 10^{-5} \Omega^{-1}$ cm.$^{-1}$ at 22° C.

14. The cell of claim 12 wherein the anode comprises electrolytically available lithium and the electrolyte salt is a lithium salt.

15. The cell of claim 12 wherein the anode comprises electrolytically available sodium and the electrolyte salt is a sodium salt.

16. The cell of claim 12 wherein the anode comprises electrolytically available lithium and the electrolyte salt is lithium tetrachloroaluminate.

17. The cell of claim 12 wherein the anode comprises electrolytically available lithium and the electrolyte salt is lithium tetrabromoaluminate.

18. The cell of claim 12 wherein the anode comprises electrolytically available sodium and the electrolyte salt is sodium tetrachloroaluminate.

19. The cell of claim 12 wherein the anode comprises electrolytically available sodium and the electrolyte salt is sodium tetrabromoaluminate.

References Cited

UNITED STATES PATENTS 3,073,884  1/1963  Pinkerton _____ 136—137

WINSTON A. DOUGLAS, Primary Examiner

C. F. LE FEVOUR, Assistant Examiner

U.S. Cl. X.R.

136—6, 20, 83, 100, 155; 204—14, 59